United States Patent [19]

Kawai

[11] Patent Number: 5,061,852
[45] Date of Patent: Oct. 29, 1991

[54] RADIATION IMAGE READ-OUT APPARATUS

[75] Inventor: Yasuhiro Kawai, Kanagawa, Japan

[73] Assignee: Fuji Photo Film Co., Ltd., Kanagawa, Japan

[21] Appl. No.: 373,364

[22] Filed: Jun. 29, 1989

[30] Foreign Application Priority Data

Jun. 30, 1988 [JP] Japan .................................. 63-162898

[51] Int. Cl.$^5$ .............................................. G01T 1/105
[52] U.S. Cl. ................................ 250/327.2; 250/484.1
[58] Field of Search ................. 250/327.2 A, 327.2 H, 250/327.2 J, 327.2 K, 484.1 B; 271/7

[56] References Cited

U.S. PATENT DOCUMENTS 4,746,797  5/1988  Yamamoto ....................... 250/327.2
4,754,144  6/1988  Seto ................................. 250/484.1

*Primary Examiner*—Janice A. Howell
*Assistant Examiner*—Richard Hanig
*Attorney, Agent, or Firm*—Sughrue, Mion, Zinn, Macpeak & Seas

[57] ABSTRACT

A radiation image read-out apparatus comprises a first sheet conveyor which has a length approximately equal to the length of a stimulable phosphor sheet and which receives the stimulable phosphor sheet from a cassette holding section and conveys it into a read-out section. A second sheet conveyor receives the stimulable phosphor sheet from the first sheet conveyor and conveys it forwardly and backwardly in the read-out section. A third sheet conveyor receives the stimulable phosphor sheet, which was conveyed backwardly by the second sheet conveyor, and conveys it into an erasing section and then into a cassette in the cassette holding section. The cassette holding section and the read-out section face each other on the same side of the first sheet conveyor. The erasing section is positioned close and parallel to the first sheet conveyor and is shorter than the stimulable phosphor sheet. The third sheet conveyor intermittently conveys the stimulable phosphor sheet through the erasing section and temporarily stops it after energy remaining thereon has been erased.

8 Claims, 1 Drawing Sheet

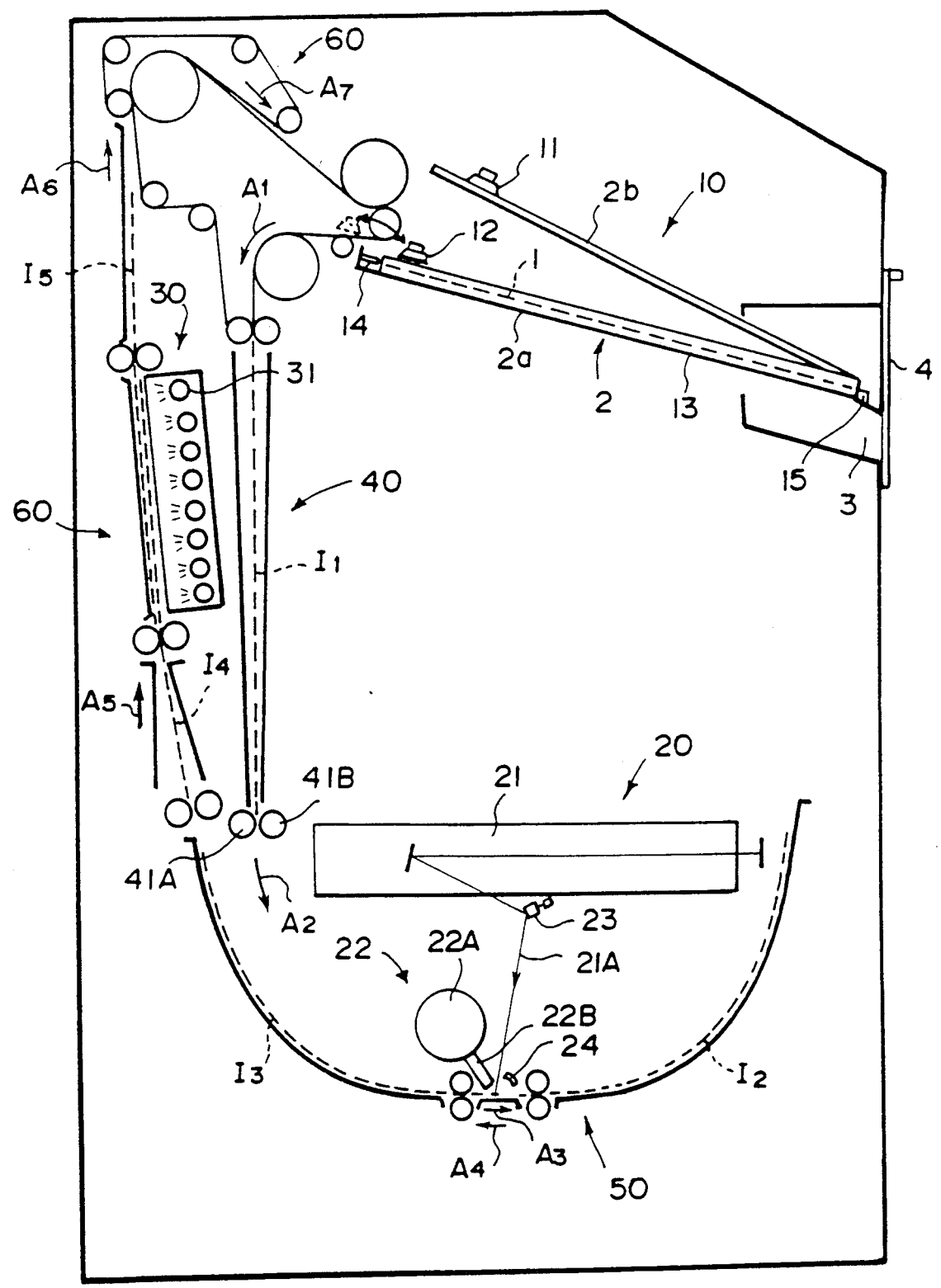

RADIATION IMAGE READ-OUT APPARATUS

BACKGROUND OF THE INVENTION

1. Field of the Invention

This invention relates to a radiation image read-out apparatus wherein a read out section and an erasing section are combined with each other. This invention particularly relates to a radiation image read-out apparatus which is small in size.

2. Description of the Prior Art

When certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in radiation image recording and reproducing systems. Specifically, a sheet provided with a layer of the stimulable phosphor (hereinafter referred to as a stimulable phosphor sheet) is first exposed to radiation, which has passed through an object such as the human body, in order to store a radiation image of the object thereon, and is then scanned with stimulating rays such as a laser beam which cause it to emit light in proportion to the amount of energy stored thereon during exposure to radiation. The light emitted by the stimulable phosphor sheet upon stimulation thereof is photoelectrically detected and converted into an electric image signal, which is used to reproduce the radiation image of the object as a visible image on a recording material such as photographic film, a display device such as a cathode ray tube (CRT), or the like.

In the aforesaid radiation image recording and reproducing systems, the stimulable phosphor sheet is used temporarily to store a radiation image until the sheet is scanned with stimulating rays and the radiation image is read out therefrom. After the radiation image is read out from the stimulable phosphor sheet, energy remaining thereon should be erased so that the sheet may be reused.

For satisfying this requirement, it has been proposed to provide a radiation image read-out apparatus with a read-out section for reading out an image stored on a stimulable phosphor sheet, and an erasing section for erasing energy remaining on the sheet.

In the proposed radiation image read-out apparatus, a cassette housing a stimulable phosphor sheet carrying a radiation image, which was stored thereon in an external image recording apparatus, is fed to a cassette holding section, and the stimulable phosphor sheet is taken out of the cassette and sent to the read-out section, where the radiation image is read out. After the read-out of the image is finished, the stimulable phosphor sheet is sent to the erasing section, where any energy remaining on the sheet is erased. The erased stimulable phosphor sheet is then taken out of the read-out apparatus and reused for image recording. In general, a plurality of the erased, reusable stimulable phosphor sheets are stacked in a stacking tray inside of the read-out apparatus, and they are still housed in the stacking tray when they are taken out of the read-out apparatus. Since when they are to be reused for image recording, the stimulable phosphor sheets need to be housed one by one in cassettes as described above, it is necessary to load the sheets from the stacking tray one by one into the cassettes prior to the recording of an image thereon. Therefore, it takes a long time to load each stimulable phosphor sheet into a cassette after the sheets have been prepared for image recording. Therefore it is not always possible to circulate and reuse the sheets efficiently. Also, loading of the stimulable phosphor sheet into the cassette is carried out either manually or with a special-purpose loader. The cost of the overall system increases in cases where a special-purpose loader is used, and manual loading is disadvantageous from the viewpoint of sheet processing since the sheet must be manually handled.

Accordingly, as disclosed in, for example, Japanese Unexamined Patent Publication Nos. 62(1987)-90641 and 62(1987)-164039, the applicant proposed radiation image read-out apparatuses wherein a cassette housing a stimulable phosphor sheet on which a radiation image was stored in an external image recording apparatus is fitted to a cassette holding section. The stimulable phosphor sheet is then taken out of the cassette, subjected to a read-out operation, erased, and conveyed into the employ cassette.

However, with the proposed radiation image read-out apparatuses, because the stimulable phosphor sheet is returned to the cassette after the read-out operation and erasure of the stimulable phosphor sheet are finished, the stimulable phosphor sheet must be circulated by a sheet conveyance means in the radiation image read-out apparatuses. Because the radiation image read-out apparatuses must be provided with the sheet conveyance means, the radiation image read-out apparatuses cannot be kept small in size. For example, the longitudinal and transverse lengths of the proposed radiation image read-out apparatuses are approximately equal to the total length of several stimulable phosphor sheets. Therefore, the proposed radiation image read-out apparatuses can be installed only where relatively large areas are available.

SUMMARY OF THE INVENTION

The object of the present invention is to provide a radiation image read-out apparatus, wherein after a stimulable phosphor sheet is taken out of a cassette, subjected to a read-out operation and erased, the stimulable phosphor sheet is returned to the cassette, and which apparatus is small in size.

The present invention provides a radiation image read-out apparatus comprising:

i) a read-out section for reading out a radiation image stored on a stimulable phosphor sheet, ii) an erasing section for erasing energy remaining on a stimulable phosphor sheet after the radiation image has been read out therefrom, iii) a cassette holding section for releasably holding a cassette capable of housing a stimulable phosphor sheet therein, said cassette holding section being provided with a take-out means which takes said stimulable phosphor sheet out of said cassette, iv) a first sheet conveyance means for receiving a stimulable phosphor sheet, which was taken out of said cassette holding section, and conveying said stimulable phosphor sheet into said read-out section, v) a second sheet conveyance means provided at said read-out section for receiving a stimulable phosphor sheet from said first sheet conveyance means and conveying said stimulable phosphor sheet in forward and backward directions, and vi) a third sheet conveyance means for receiving a stimulable phosphor sheet, which is conveyed by said second sheet conveyance means in the backward direction, conveying said stimulable phosphor sheet into said erasing section, and thereafter conveying it into the cassette in said cassette holding section, wherein the length of said first sheet conveyance means is approximately equal to the length of a stimulable phosphor sheet, which length is measured in the direction along which the stimulable phosphor sheet is conveyed, said cassette holding section and said read-out section are positioned on the same side of said first sheet conveyance means and face each other, said erasing section is positioned close to and approximately parallel to said first sheet conveyance means, the length of said erasing section is shorter than the length of a stimulable phosphor sheet, and said third sheet conveyance means is positioned approximately parallel to said first sheet conveyance means in order to allow a stimulable phosphor sheet to be intermittently conveyed through said erasing section and to be temporarily stopped after energy remaining thereon has been erased.

With the radiation image read-out apparatus in accordance with the present invention, the first sheet conveyance means and the third sheet conveyance means are positioned close and parallel to each other, and the cassette holding section and the read-out section are positioned on the same side of the first sheet conveyance means. Therefore, the length of the radiation image read-out apparatus in one direction is approximately defined by the length of the cassette holding section or of the read-out section. The cassette holding section may have a size which makes it capable of holding a cassette which is approximately as large as a single stimulable phosphor sheet. In the read-out section, a stimulable phosphor sheet is moved in the forward and backward directions and conveyed to the third sheet conveyance means. Therefore, the read-out section may have a length, which is equal to the length of a single stimulable phosphor sheet, on both sides of the position at which the scanning with stimulating rays is carried out. If the conveyance path of the second sheet conveyance means at the read-out section is bent, the length of the read-out section can be decreased even further. Therefore, with the radiation image read-out apparatus in accordance with the present invention, when the shape of the second sheet conveyance means is designed appropriately, the length of the apparatus in one direction can be decreased to approximately the length of a single stimulable phosphor sheet. Also, the length of the first sheet conveyance means is approximately equal to the length of a stimulable phosphor sheet, and the third sheet conveyance means is positioned approximately parallel to the first sheet conveyance means. Therefore, the length of the radiation image read-out apparatus in the other direction, which is normal to said one direction, can be decreased to approximately the sum of the height of the cassette holding section, the height of the read-out section and the length of a single stimulable phosphor sheet. Accordingly, with the radiation image read-out apparatus in accordance with the present invention, the size of the apparatus can be kept markedly small in two directions.

BRIEF DESCRIPTION OF THE DRAWING

The single drawing is a schematic side view showing an embodiment of the radiation image read-out apparatus in accordance with the present invention.

DESCRIPTION OF THE PREFERRED EMBODIMENTS

The present invention will hereinbelow be described in further detail with reference to the accompanying drawing.

An embodiment of the radiation image read-out apparatus in accordance with the present invention is provided with a cassette holding section 10 for releasably holding a cassette 2 capable of housing a stimulable phosphor sheet 1 therein, a read-out section 20 for reading out a radiation image stored on the stimulable phosphor sheet 1, and an erasing section 30 for erasing any energy remaining on the stimulable phosphor sheet 1 after the radiation image has been read out therefrom. The embodiment is also provided with a first sheet conveyance means 40 for conveying a stimulable phosphor sheet 1, which was taken out of the cassette 2 in the cassette holding section 10, into the read-out section 20, a second sheet conveyance means 50 for conveying the stimulable phosphor sheet 1 in the forward and backward directions at the read-out section 20, and a third sheet conveyance means 60 for receiving the stimulable phosphor sheet 1, which was conveyed out of the read-out section 20, and conveying it into the erasing section 30 and then into the empty cassette 2. The cassette holding section 10 and the read-out section 20 are connected respectively to upper and lower edges of the first sheet conveyance means 40 and face each other. The length of the first sheet conveyance means 40 is approximately equal to the length of a single stimulable phosphor sheet, and the length of the radiation image read-out apparatus in the vertical direction is approximately equal to the sum of the height of the cassette holding section 10, the height of the read-out section 20 and the length of a single stimulable phosphor sheet.

The stimulable phosphor sheet 1 is housed in the cassette 2 and is subjected to image recording in an external image recording apparatus (not shown) in that form. The cassette 2 in which the image-recorded stimulable phosphor sheet 1 is housed is then fed to the cassette holding section 10. The cassette 2 comprises a cassette body 2a capable of housing the stimulable phosphor sheet 1 therein and a cover member 2b which can be opened. It is light-tight, which prevents the stimulable phosphor sheet 1 from being exposed to external light when it is exposed to radiation during the recording of a radiation image thereon. In this embodiment, a cassette inlet 3 is formed in a right side face of the radiation image read-out apparatus, and a shutter 4 is provided on the cassette inlet 3. The shutter 4 is opened, and the cassette 2 is inserted through the cassette inlet 3 with the cover member 2b being closed. The cassette 2 is then pushed along a guide surface 13, which is inclined upwardly, into the cassette holding section 10. The cassette 2 is pushed until a forward edge of the cassette 2 engages with a lock release pin 14 of the cassette holding section 10, which pin projects outwardly under the force of a spring. Thus a lock mechanism (not shown) for the cover member 2b is released.

When the cassette 2 is released, it falls toward the cassette inlet 3 because of gravity and the force from the lock release pin 14, and is stopped at a predetermined position by a stopper 15 which is provided at the rear of the guide surface 13. Thereafter, in the cassette holding section 10, a cover opening means 11, constituted of a suction cup or the like, opens the cover member 2b as illustrated. After the cover member 2b is opened, a sheet take-out means 12 constituted of a suction cup or the like advances into the cassette 2, sucks the image-recorded stimulable phosphor sheet 1 out of the cassette 2, and feeds it to the part of the first sheet conveyance means 40 which is present in the vicinity of the cassette holding section 10. The image-recorded stimulable phosphor sheet 1 is held in the cassette 2 with the front surface provided with the stimulable phosphor layer facing down.

Each of the first sheet conveyance means 40, the second sheet conveyance means 50, and the third sheet conveyance means 60 comprises endless belts, guide plates and rollers. The forward edge of the image-recorded stimulable phosphor sheet 1 is grasped by the first sheet conveyance means 40, and the image-recorded stimulable phosphor sheet 1 is conveyed by the first sheet conveyance means 40 in the direction indicated by the arrow A1. The image-recorded stimulable phosphor sheet 1 is temporarily stopped at a position I1 and, for example, the position of the sheet 1 is adjusted. Thereafter, the image-recorded stimulable phosphor sheet 1 is conveyed in the direction indicated by the arrow A2 into the read-out section 20.

In the read-out section 20, the stimulable phosphor sheet 1 on which a radiation image has been stored is scanned with stimulating rays 21A, such as a laser beam, which cause the sheet 1 to emit light in proportion to the amount of energy stored thereon during exposure to radiation. The emitted light is photoelectrically detected by a photoelectric read-out means 22, and thereby an electric image signal, which is to be used in the reproduction of a visible image, is obtained. Reference numeral 21 denotes a stimulating ray source such as an He-Ne laser, and reference numeral 23 denotes a light deflector such as a galvanometer mirror. In this embodiment, the photoelectric read-out means 22 is constituted of a long photomultiplier 22a, which is positioned along a main scanning line, and a small light guide member 22B, which is positioned in such a way that it is in close contact with a light receiving face of the photomultiplier 22A. A photoelectric read-out means of this type is disclosed in, for example, Japanese Unexamined Patent Publication No. 62(1987)-16666. Reference numeral 24 denotes a reflection mirror which reflects the light emitted by the stimulable phosphor sheet 1 towards the light guide member 22B. When a long photomultiplier 22A is used, the photoelectric read-out means 22 can be kept small in size. Therefore, the long photomultiplier 22A is advantageous because it contributes to keeping the radiation image read-out apparatus small in size. Alternatively, the photoelectric read-out means may be constituted of a comparatively small photomultiplier and a sheet-shaped light guide member having one end positioned along the main scanning line and the other end bent cylindrically such that it matches the light receiving face of the photomultiplier.

When the forward edge of stimulable phosphor sheet 1, which is being conveyed in the direction indicated by the arrow A2 into the read-out section 20, arrives at the position at which it is scanned with stimulating rays, the backward edge of the stimulable phosphor sheet 1 is still grasped by nip rollers 41A and 41B of the first sheet conveyance means 40. If the radiation image were read out from the stimulable phosphor sheet 1 with the sheet in this condition, the image read out could not be carried out accurately due to nonuniformity in the speed of movement of the stimulable phosphor sheet 1 or the like. Therefore, the stimulable phosphor sheet 1 is conveyed in the direction indicated by the arrow A3, i.e. in the forward direction, by the second sheet conveyance means 50 to the position indicated by I2. Thereafter, image read out from the stimulable phosphor sheet 1 is carried out while the stimulable phosphor sheet 1 is being conveyed in the direction indicated by the arrow A4, i.e. in the backward direction. During the image read out, the stimulable phosphor sheet 1 is scanned with the stimulating rays 21A in a direction approximately normal to the direction along which the stimulable phosphor sheet 1 is moved, so that the whole surface of the stimulable phosphor sheet 1 is two-dimensionally scanned with the stimulating rays 21A. As the stimulable phosphor sheet 1 is exposed to the stimulating rays 21A, the exposed portion of the stimulable phosphor sheet 1 emits light in proportion to the amount of energy stored thereon during exposure to radiation. The emitted light is guided through the light guide member 22B and detected by the photomultiplier 22A. The emitted light is converted into an electric signal by the photomultiplier 22A, and the electric signal is fed into an image processing circuit (not shown) which processes the electric signal.

As for the radiation image read out, there has heretofore been known a method wherein a preliminary read-out operation is carried out, which allows the radiation image stored on the stimulable phosphor sheet 1 to be approximately ascertained before the aforesaid image read out (final read out) is carried out and an electric image signal to be used in the reproduction of a visible image is obtained. Conditions under which the final read-out is to be carried out or the like are determined on the basis of information obtained during the preliminary read out.

As disclosed in, for example, Japanese Unexamined Patent Publication No. 58(1983)-67240, during the preliminary read out the stimulable phosphor sheet 1 may be scanned with stimulating rays having an energy level lower than the level of the energy of the stimulating rays used in the final read-out, and the light emitted by the stimulable phosphor sheet 1 during the scanning may be detected by a photoelectric read-out means.

The read-out section 20 may be constituted such that it conducts only the final read out or both the preliminary read out and the final read out. During the preliminary read out, the accuracy with which the stimulable phosphor sheet 1 is conveyed may not be as high as during the final read out. Therefore, the preliminary read out may be carried out while the stimulable phosphor sheet 1 is being moved in the direction indicated by the arrow A3 to the position indicated by I2. Thereafter, the final read out may be carried out while the stimulable phosphor sheet 1 is being moved in the direction indicated by the arrow A4. In cases where the preliminary read out and the final read out should be begun at the same portion of the stimulable phosphor sheet 1, the stimulable phosphor sheet 1 on which the preliminary read out has been carried out may be moved in the direction indicated by the arrow A4 to the position indicated by I3, and the final read out may then be carried out while the stimulable phosphor sheet 1 is being moved in the direction indicated by the arrow A3. After the final read out from the stimulable phosphor sheet 1 is finished, the stimulable phosphor sheet 1 may be moved in the direction indicated by the arrow A4 to the position indicated by I3.

In this embodiment, the width of the radiation image read-out apparatus in the transverse direction is defined by the length of the read-out section 20. The second sheet conveyance means 50 conveys the stimulable phosphor sheet 1 along a curved conveyance path. Therefore, the length of the read-out section 20 in the transverse direction is approximately as small as the length of a single stimulable phosphor sheet.

Accordingly, the length of the radiation image read-out apparatus in the transverse direction is kept very small.

After the image read out from the stimulable phosphor sheet 1 is finished, the sheet 1 is conveyed by the third sheet conveyance means 60 in the direction indicated by the arrow A5 into the erasing section 30. The first sheet conveyance means 40 and the third sheet conveyance means 60 are approximately parallel to each other. Also, the erasing section 30 is approximately parallel to the first sheet conveyance means 40.

In the erasing section 30, any energy remaining on the stimulable phosphor sheet 1 after the radiation image has been read out therefrom is erased. Specifically, part of the energy stored on the stimulable phosphor sheet 1 during the recording of an image remains stored thereon after the image has been read out therefrom. So that the stimulable phosphor sheet 1 may be reused, the residual energy is erased at the erasing section 30. In this embodiment, the erasing section 30 is provided with a plurality of erasing light sources 31, 31, . . . constituted of fluorescent lamps, tungsten-filament lamps, sodium lamps, xenon lamps, iodine lamps or the like. The stimulable phosphor sheet 1 is exposed to the erasing light produced by the erasing light sources 31, 31, . . . in order to cause the stimulable phosphor sheet 1 to release the residual energy.

The length of the erasing section 30 is shorter than the length of a single stimulable phosphor sheet, and the stimulable phosphor sheet is kept stationary during the erasing operation in the erasing section 30. Specifically, in order to keep the radiation image read-out apparatus small, the read-out section 20 and the erasing section 30 are positioned comparatively close to each other. Therefore, if the erasing operation were carried out while the stimulable phosphor sheet was being moved in the erasing section 30, the backward edge of the stimulable phosphor sheet, as viewed in the direction along which the stimulable phosphor sheet is conveyed by the third sheet conveyance means 60, would remain in the read-out section 20 when the erasing was started, and a new stimulable phosphor sheet could not be conveyed into the read-out section 20. On the other hand, if the erasing is carried out with the stimulable phosphor sheet being kept stationary in the erasing section 30, the stimulable phosphor sheet can be quickly moved to the first erasing position indicated by I4 after the image read out from the stimulable phosphor sheet is finished. Therefore, a new stimulable phosphor sheet can be immediately conveyed into the read out section 20. Also, as described above, the length of the erasing section 30 is shorter than the length of a single stimulable phosphor sheet. The stimulable phosphor sheet is stopped at the position I4 by the third sheet conveyance means 60, and the erasing operation is carried out on the forward half of the stimulable phosphor sheet, as viewed in the direction along which the stimulable phosphor sheet is conveyed by the third sheet conveyance means 60. Thereafter the stimulable phosphor sheet is conveyed to the position indicated by I5, and the erasing operation is carried out on the backward half of the stimulable phosphor sheet, as viewed in the direction along which the stimulable phosphor sheet is conveyed by the third sheet conveyance means 60. Alternatively, the length of the erasing section 30 may further be decreased, so that the erasing operation is carried out stepwise on each of three or more parts of the stimulable phosphor sheet.

In cases where an empty cassette 2 is located in the cassette holding section 10, the stimulable phosphor sheet 1, which has been erased, is conveyed in the directions indicated by the arrows A6 and A7 into the empty cassette 2. Because the cassette 2 is held obliquely, after the stimulable phosphor sheet 1 separates from the third sheet conveyance means 60, it falls under the force of gravity into the cassette body 2a. In cases where no empty cassette is present in the cassette holding section 10 because of, for example, an interruption in the operation of the radiation image read-out apparatus, or in cases where image read out from a preceding stimulable phosphor sheet is being carried out and a next stimulable phosphor sheet has not been taken out of the cassette, the stimulable phosphor sheet 1, which has been erased, is made to wait at the position I5. In cases where at least a predetermined time has elapsed since the stimulable phosphor sheet 1 was erased, the energy from radiation emitted by radioactive isotopes such as Ra226 and K40, which are contained in trace amounts in the stimulable phosphor, or the energy from environmental radiation such as cosmic rays and X-rays emitted by other X-ray sources, is stored on the stimulable phosphor sheet 1. This type of radiation energy is undesirably stored on the stimulable phosphor sheet 1 and causes noise in the next radiation image which is recorded on the sheet 1. Therefore, in cases where the stimulable phosphor sheet 1, which has been erased, is made to wait for a long time at the position I5, in order to prevent noise from being generated, the stimulable phosphor sheet 1 should preferably be subjected to a secondary erasing operation. In such cases, the stimulable phosphor sheet 1 is returned to the position I4, and a secondary erasing operation is carried out on the forward half of the stimulable phosphor sheet 1. Thereafter, the stimulable phosphor sheet 1 is conveyed to the position I5, and a secondary erasing operation is carried out on the backward half of the stimulable phosphor sheet 1.

The timing with which the cassette is fed into and out of the radiation image read-out apparatus and the timing with which the stimulable phosphor sheet is fed into and out of the cassette will be described hereinbelow. When the cassette holding section 10 is empty, a cassette 2, in which a stimulable phosphor sheet 1 having an image recorded thereon is housed, can be fed into the cassette holding section 10. When the read-out section 20 is empty, the stimulable phosphor sheet 1 is immediately taken out of the cassette 2 and conveyed into the read-out section 20. In cases where image read out from a preceding stimulable phosphor sheet 1 is being carried out, the next stimulable phosphor sheet 1 housed in the cassette 2 waits therein with the lock mechanism for the cover member 2b being released. At this time, the cassette in the cassette holding section 10 can be exchanged or the conditions under which the stimulable phosphor sheet is to be read out can be changed. On the other hand, in cases where a stimulable phosphor sheet 1, which has been erased, is present at the position I5, it is conveyed into the empty cassette after being subjected to a secondary erasing operation (or immediately in cases where a long time has not elapsed since the primary erasing operation was carried out). Therefore, the cassette can be immediately taken out of the radiation image read-out apparatus and used in a new image recording operation. In cases where no stimulable phosphor sheet is present at the position I5, the empty cassette waits until a stimulable phosphor sheet, from which the image has been read out and which has been erased, is conveyed to the cassette. In such cases, because the stimulable phosphor sheet does not wait at the position I5, it need not be subjected to a secondary erasing operation.

I claim:

1. A radiation image read-out apparatus comprising:
    i) a read-out section for reading out a radiation image stored on a stimulable phosphor sheet,
    ii) an erasing section for erasing energy remaining on a stimulable phosphor sheet after the radiation image has been read out therefrom,
    iii) a cassette holding section for releasably holding a cassette capable of housing a stimulable phosphor sheet therein, said cassette holding section being provided with a take-out means which takes said stimulable phosphor sheet out of said cassette,
    iv) a first sheet conveyance means for receiving a stimulable phosphor sheet, which was taken out of said cassette holding section, and conveying said stimulable phosphor sheet into said read-out section,
    v) a second sheet conveyance means provided at said read-out section for receiving a stimulable phosphor sheet from said first sheet conveyance means and conveying said stimulable phosphor sheet in forward and backward directions, and
    vi) a third sheet conveyance means for receiving a stimulable phosphor sheet, which is conveyed by said second sheet conveyance means in the backward direction, conveying said stimulable phosphor sheet into said erasing section, and thereafter conveying it into the cassette in said cassette holding section,
    wherein the length of said first sheet conveyance means is approximately equal to the length of a stimulable phosphor sheet, which length is measured in the direction along which the stimulable phosphor sheet is conveyed,
    said cassette holding section and said read-out section are positioned on the same side of said first sheet conveyance means and face each other,
    said erasing section is positioned close to and approximately parallel to said first sheet conveyance means,
    the length of said erasing section is shorter than the length of a stimulable phosphor sheet, and
    said third sheet conveyance means is positioned approximately parallel to said first sheet conveyance means in order to allow a stimulable phosphor sheet to be intermittently conveyed through said erasing section, and to be temporarily stopped after energy remaining thereon has been erased.

2. An apparatus as defined in claim 1 wherein said read-out section comprises a photoelectric read-out means constituted of a long photomultiplier, which is positioned along a main scanning line on the stimulable phosphor sheet, and a small light guide member positioned in such a way that it is in close contact with a light receiving face of said long photomultiplier.

3. An apparatus as defined in claim 1 wherein said read-out section comprises a photoelectric read-out means constituted of a comparatively small photomultiplier and a sheet-shaped light guide member having one end positioned along a main scanning line on the stimulable phosphor sheet and the other end bent cylindrically so that it matches a light receiving face of said photomultiplier.

4. An apparatus as defined in claim 1 wherein said read-out section carries out both a preliminary read-out operation and a final read-out operation.

5. An apparatus as defined in claim 4 wherein said preliminary read-out operation is carried out while the stimulable phosphor sheet is being moved in the forward direction, and said final read-out operation is carried out while the stimulable phosphor sheet is then being moved in the backward direction.

6. An apparatus as defined in claim 4 wherein said preliminary read-out operation is carried out while the stimulable phosphor sheet is being moved in the forward direction, the stimulable phosphor sheet is then conveyed in the backward direction, and thereafter said final read-out operation is carried out while the stimulable phosphor sheet is being again moved in the forward direction.

7. An apparatus as defined in claim 1 wherein the length of said erasing section is shorter than the length of the stimulable phosphor sheet so that the erasing operation is carried out stepwise on each of two or more parts of the stimulable phosphor sheet.

8. An apparatus as defined in claim 1 wherein said third sheet conveyance means again intermittently conveys the stimulable phosphor sheet, which has been temporarily stopped after energy remaining on said stimulable phosphor sheet was erased, through said erasing section in order to cause said stimulable phosphor sheet to be subjected to a secondary erasing operation.

* * * * *